United States Patent
Bindig et al.

(10) Patent No.: US 10,031,034 B2
(45) Date of Patent: Jul. 24, 2018

(54) PRESSURE SENSOR FOR DETECTING FORCE

(71) Applicant: CeramTec GmbH, Plochingen (DE)

(72) Inventors: Reiner Bindig, Bindlach (DE); Tobias Schmidt, Lauf (DE); Hans-Jürgen Schreiner, Hersbruck (DE)

(73) Assignee: CeramTec GmbH, Plochingen (DE)

( * ) Notice: Subject to any disclaimer, the term of this patent is extended or adjusted under 35 U.S.C. 154(b) by 0 days.

(21) Appl. No.: 14/912,793

(22) PCT Filed: Aug. 18, 2014

(86) PCT No.: PCT/EP2014/067576
§ 371 (c)(1),
(2) Date: Feb. 18, 2016

(87) PCT Pub. No.: WO2015/024906
PCT Pub. Date: Feb. 26, 2015

(65) Prior Publication Data
US 2016/0195439 A1 Jul. 7, 2016

(30) Foreign Application Priority Data
Aug. 19, 2013 (DE) .......... 10 2013 216 402

(51) Int. Cl.
*G01L 1/14* (2006.01)
*G01L 1/16* (2006.01)

(52) U.S. Cl.
CPC ............ *G01L 1/142* (2013.01); *G01L 1/14* (2013.01); *G01L 1/16* (2013.01)

(58) Field of Classification Search
CPC ............ G01L 1/142; G01L 1/14; G01L 1/16

USPC ................................................. 73/862.626
See application file for complete search history.

(56) References Cited

U.S. PATENT DOCUMENTS

| 4,413,202 A | 11/1983 | List |
| 5,268,611 A * | 12/1993 | Culp ............... H01L 41/0993 310/328 |
| 6,664,715 B2 | 12/2003 | Takahashi et al. |
| 7,938,074 B2 * | 5/2011 | Liu .................. A01C 5/068 111/164 |

(Continued)

FOREIGN PATENT DOCUMENTS

| DE | 2 086 584 A | 5/1982 |
| DE | 12 2008 002925 A1 | 5/2009 |
| JP | 2004226294 A * | 8/2004 |

OTHER PUBLICATIONS

Castellini et al, "Development of a Film Sensor for Static and Dynamic Force Measurement", Rev. of Sci. Instru., vol. 73, No. 9, pp. 3378-3385.*

(Continued)

*Primary Examiner* — Lisa Caputo
*Assistant Examiner* — Nathaniel T Woodward
(74) *Attorney, Agent, or Firm* — Norton Rose Fulbright US LLP

(57) ABSTRACT

A method, a device and use for measurement of a force with a pressure sensor made of a piezoelectric material. The change in the capacitance of the pressure sensor is used for force measurement so that no load amplifier is necessary for measurement and as a result the measuring system as a whole is miniaturized.

14 Claims, 4 Drawing Sheets

(56) References Cited

U.S. PATENT DOCUMENTS

2002/0185935 A1     12/2002    Takahashi et al.
2009/0223282 A1*    9/2009    Yamazaki ............. C04B 35/491
                                                                                73/35.11

OTHER PUBLICATIONS

Sidorkin et al., Fatigue of Lead Titanate and Lead Zirconate Titanate Thin Films, Physics of the Solid State, 2008, vol. 50, No. 11, pp. 2157-2163.*

Takahashi, et al. "Effects of Impurities on the Mechanical Quality Factor of Lead Zirconate Titanate Ceramics", Japanese J. of Applied Physics, vol. 11, No. 1 (1972), pp. 31-35.

* cited by examiner

PRESSURE SENSOR FOR DETECTING FORCE

This application is a § 371 of International Application No. PCT/EP2014/067576 filed Aug. 18, 2014, and claims priority from German Patent Application No. 10 2013 216 402.5 filed Aug. 19, 2013.

FIELD OF THE INVENTION

BACKGROUND OF THE INVENTION

The invention relates to a method, a device and use for measurement of a force with a pressure sensor made of a piezoelectric material.

In the prior art the force is determined by means of the induced charge, as is the case for example in quartz load cells and piezoelectric sensors. In this connection a charging amplifier is necessary for metrological evaluation.

OBJECT OF THE INVENTION

The object of the invention is to modify a method for measurement of a force using a pressure sensor made of a piezoelectric material so that no charge amplifier is necessary for measurement and as a result the measuring system as a whole is miniaturized.

SUMMARY OF THE INVENTION

This object is achieved according to the invention by the method of the inventions which relates to a method and device for measurement of a force using a pressure sensor made of a piezoelectric material, characterized in that the change in the capacitance of the pressure sensor is used for force measurement.

Because the change in the capacitance of the pressure sensor is used for force measurement, no charge amplifier is necessary for measurement and as a result the measuring system as a whole is miniaturized.

DETAILED DESCRIPTION

In order to eliminate disturbance variables the measurement of the capacitance preferably takes place by the lock-in process at a defined measurement frequency. The measurement frequency is preferably between 800 Hz and 1.2 kHz, and is particularly preferably 1 kHz.

A pressure sensor according to the invention for carrying out the method just described is characterized in that the piezoelectric material is preferably hard, i.e. it has a high mechanical quality in the range from 200 to 2000, particularly preferably 400 to 1200 and has high coercive field strengths >1.5 kV/mm, preferably >2 kV/mm at room temperature.

Figure 5:
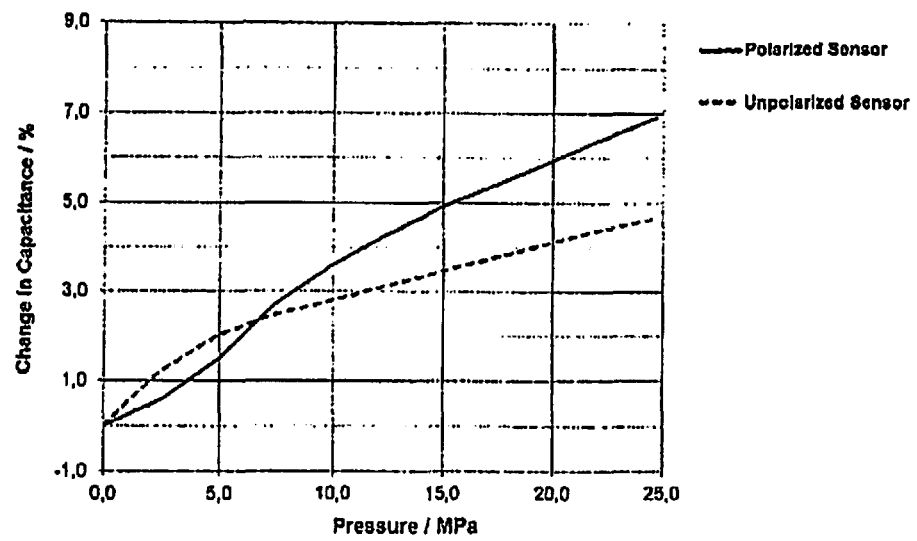
FIG. 5 is a graph of the change in capacitance/% v. pressure (MPa) for a polarized sensor compared to an unpolarized sensor.

The pressure sensor may be polarized or unpolarized. Polarized pressure sensors offer the advantage of starting the measurement by a pulse and thus of saving energy. Polarized pressure sensors exhibit a steeper rise in the capacitance. Above a specific start-up load, unpolarized pressure sensors have a clearly linear characteristic (see FIG. 5). Thus the polarized pressure sensor has simpler force detection and the unpolarized pressure sensor has the advantages of more precise force determination. Combining both effects through electrotechnical linking of both types of pressure sensor is conceivable for capacitive force measurement.

It is therefore advantageous if the measurement of the force takes place simultaneously with a polarized and with an unpolarized pressure sensor and the capacitances of both pressure sensors are supplied to an electrotechnical link.

The pressure sensor is preferably a round plate with chamfered edges.

The measurement signal is preferably transmitted wirelessly to an evaluation unit.

According to the invention, the use of a pressure sensor is for measurement of a load signal for medical applications or for measurement of a load signal for industrial applications or for measurement of a load signal for consumer applications or for measurement of a load signal for automotive applications.

Figure 1:
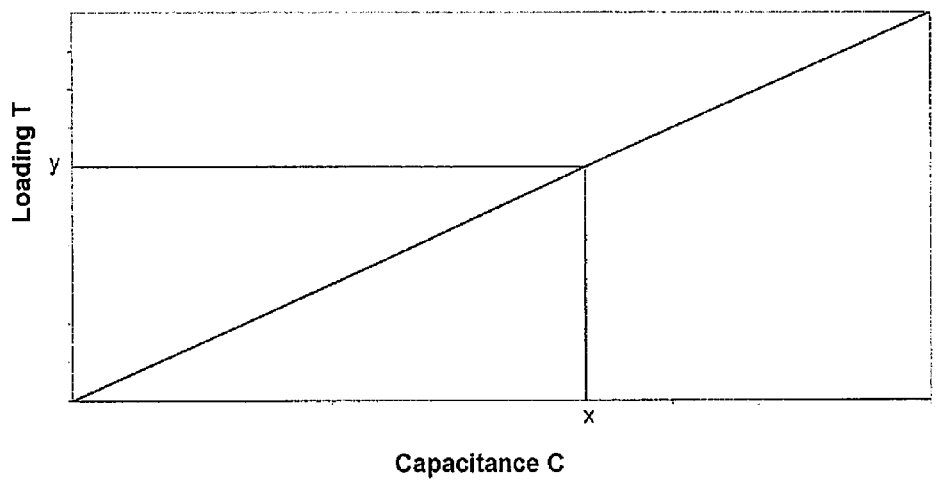
FIG. 1 is a graph showing loading v. capacitance.
Figure 2:
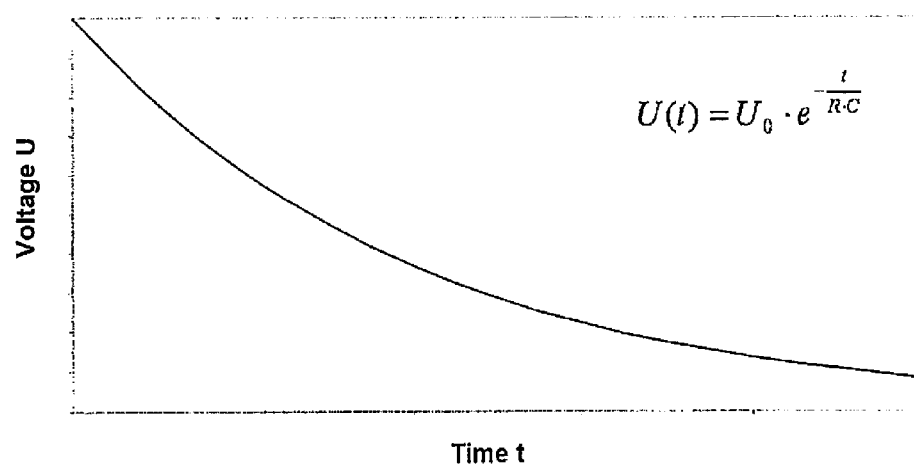
FIG. 2 is a graph showing voltage v. time.

Thus the measurement principle is based on the measurement of the capacitance of a pressure-loaded pressure sensor which is made of piezoelectric material 3. Under pressure loading a contraction of the piezoelectric pressure sensor and thus a change in the capacitance takes place. The force or the pressure applied during the loading can be determined from this correlation with reference to the measured capacitance (see FIG. 1). The change in capacitance is composed of a ferroelectric proportion and a geometric proportion, wherein the ferroelectric proportion, that is to say the change in the dielectric constants, predominates and determines the signal strength. In a direct capacitive force measurement a charge amplifier is not necessary, so that a significant miniaturization of the measuring system is possible.

Figure 3:
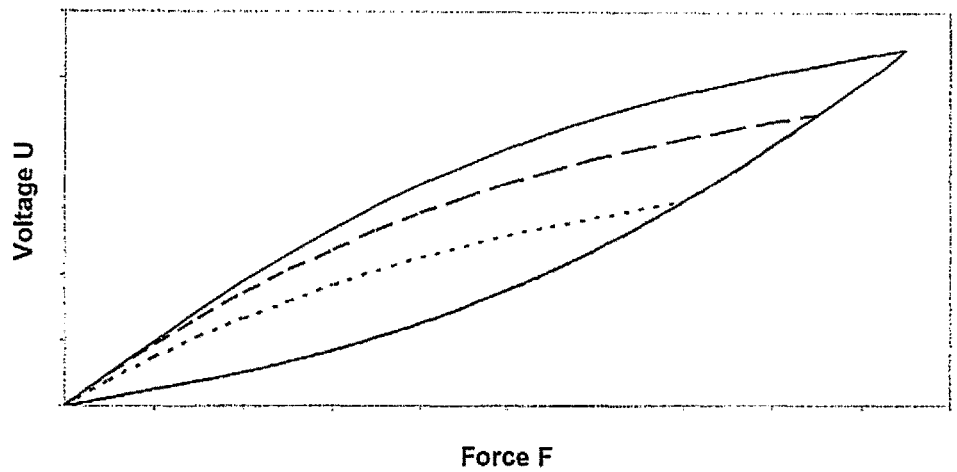
FIG. 3 is a graph showing voltage v. force.

When the piezoelectric effect is used, losses occur due to conductivities of the material (see character 2) and due to hysteresis effects (see FIG. 3). The measurement of the capacitance takes place by the lock-in method at a specific measurement frequency, preferably between 800 Hz and 1.2 kHz, particularly preferably 1 kHz, so that other disturbance variables are eliminated.

Both a ferroelectrically soft and also hard material can be used for the sensor.

Studies which have been conducted were able to demonstrate a better linear behavior between applied pressure and measured capacitance for hard piezoelectric materials.

Hard piezoelectric materials are understood to be materials having a high mechanical quality in the range from 200 to 2000, preferably 400 to 1200, which at room temperature have high coercive field strengths >1.5 kV/mm, preferably >2 kV/mm.

Figure 4:
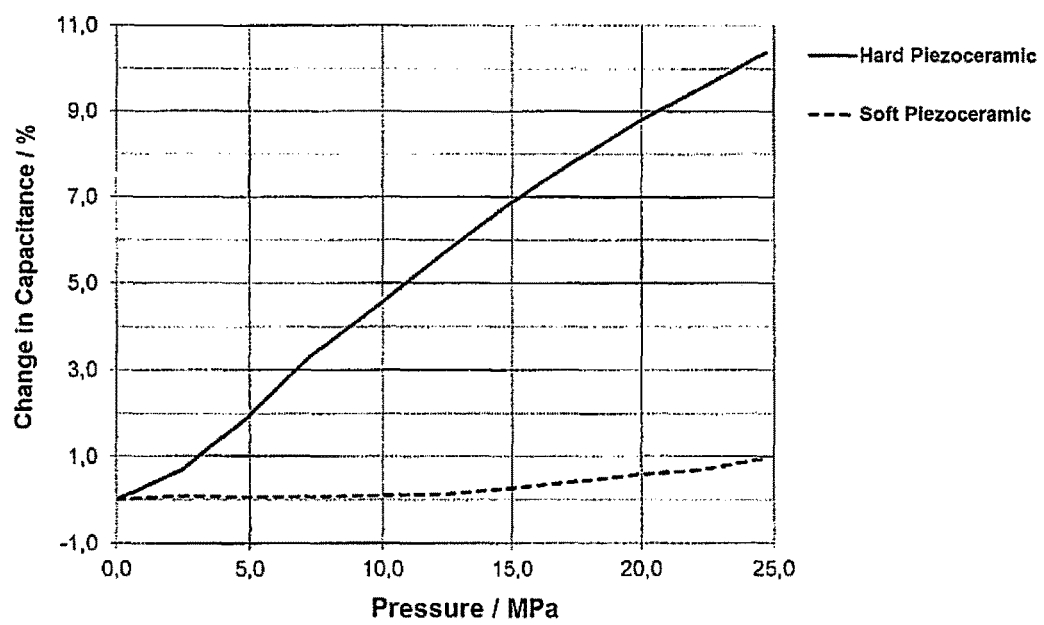
FIG. 4 is a graph of the change in capacitance/% v. pressure (MPa) for a hard piezoelectric ceramic and a soft piezoelectric ceramic.

Furthermore, in the case of hard piezoceramics, the sensitivity is substantially greater (see FIG. 4). This results in the advantage of a simpler metrological determination of the loading.

For the application, a polarized pressure sensor 2 is used, since this simultaneously offers the possibility of starting the measurement by a pulse and thus of saving energy. Nevertheless unpolarized pressure sensors can also be used purely for capacitance measurement. Whilst the polarized pressure sensor exhibits the steeper rise in capacitance, above a specific start-up load a clearly linear characteristic (see FIG. 5) is produced for the unpolarized pressure sensors. Thus the polarized pressure sensor has simpler force detection and the unpolarized pressure sensor has the advantages of more precise force determination. Combining both effects through electrotechnical linking of both types of pressure sensor is conceivable for capacitive force measurement.

Figure 7:
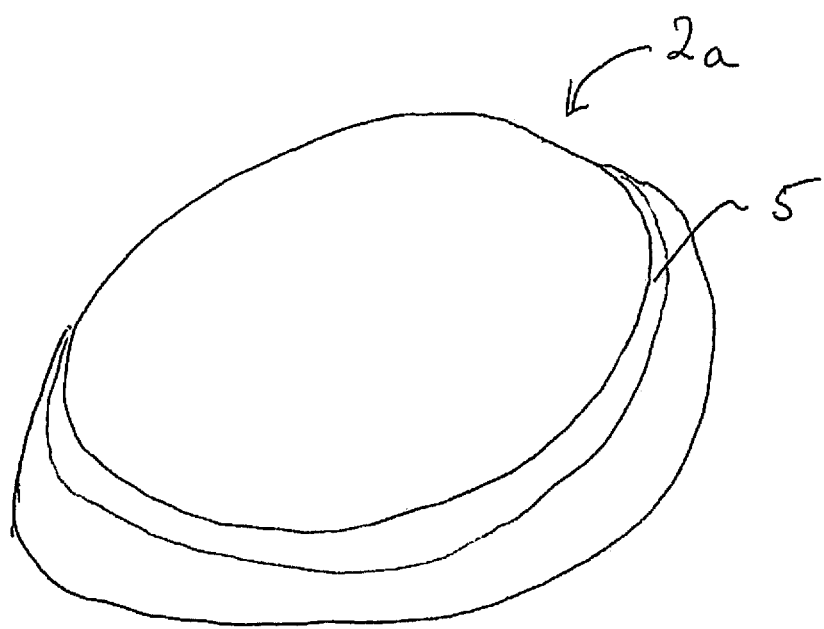
FIG. 7 shows an embodiment of the invention.

The pressure sensor may be configured for example in the form of a round plate 2a as shown in FIG. 7. The pressure sensors with a chamfered edge 5 which are used have an increased strength in the event of pressure loading. A better linear correlation between loading and measured capacitance can be achieved by the choice of a hard piezoceramic.

The present invention relates in particular to:

A pressure sensor for measurement of a force, characterized in that the change in the dielectric constants is used for force measurement.

A pressure sensor for measurement of a force, characterized in that the material used is piezoelectric/ferroelectric and the change in force effects a change in polarization and thus the change in the dielectric constants can be measured.

A pressure sensor for measurement of a force, characterized in that a polarized ferroelectric material is used in order to enable charge generation.

A pressure sensor for measurement of a force which, upon loading, starts up a circuit for a measurement by means of the charge generation ("trigger signal"). Before the loading, energy can be saved with the circuit in a resting phase.

A pressure sensor for measurement of a force, consisting of an unpolarized piezoceramic for better measurement of the load signal.

A combination of polarized and unpolarized ferroelectrics made of the same or different material, in order to dissociate the measurement from the "trigger signal."

A system which is characterized in that for elimination of temperature and other environmental influences one or more further ferroelectric components of the same or a different type remain unloaded. By the measurement of the capacitance of the unloaded components it is possible for example to eliminate the temperature influence.

A system for measurement of a load signal for medical applications.

A system for measurement of a load signal for industrial applications.

A system for measurement of a load signal for consumer applications.

A system for measurement of a load signal for automotive applications.

A system which is characterized in that the energy necessary for measurement is generated by means of the polarized ferroelectrics ("energy harvesting").

A system which is characterized in that the measurement signal is transmitted wirelessly to an evaluation unit.

The invention is described in greater detail with reference to an example.

EXAMPLE

Medical Loading Sensor

This application involves a medical measuring system for recording loadings on limbs, for example the foot. The pressure sensor is located under the foot and senses the forces produced upon loading of the foot and transmits these via a wireless link to a storage medium. Monitoring of the progress of healing is possible by a knowledge of the static and dynamic capacitive force measurement, and by excluding disturbance variables, such as for example the temperature. Likewise it is possible to intervene in the healing process with reference to the measurement data.

Figure 6:
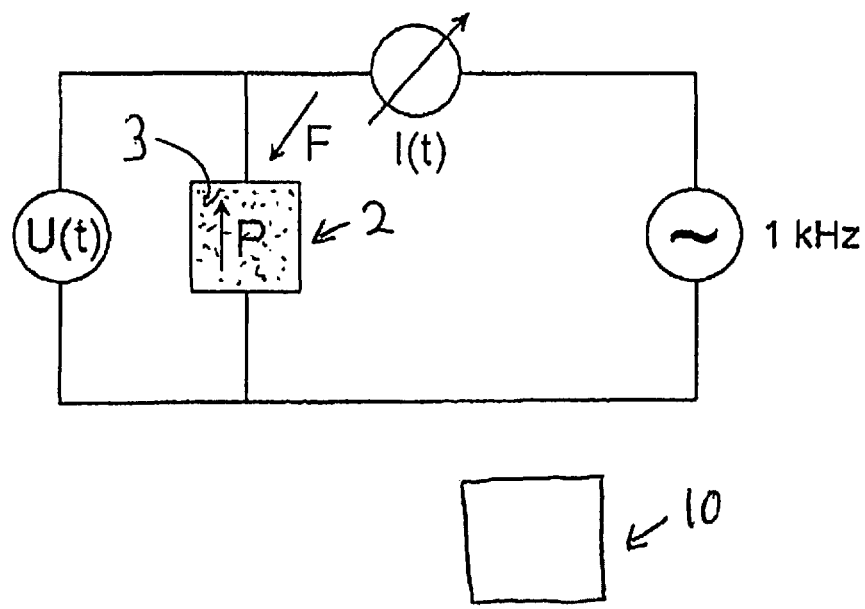
FIG. 6 represents a medical loading sensor according to the invention wherein ↑P is the polarization. Evaluation unit 10 is shown in a wireless embodiment.

(see FIG. 6)

It is claimed:

1. A method comprising the steps of:
measuring with a pressure sensor comprising a polarized pressure sensor and an unpolarized pressure sensor a force, wherein the measuring occurs simultaneously with the polarized pressure sensor and with the unpolarized pressure sensor, wherein both the polarized pressure sensor and the unpolarized pressure sensor comprise a piezoelectric material and wherein capacitances of both the polarized pressure sensor and the unpolarized pressure sensor are supplied to an electrotechnical link in an evaluation unit, and wherein the piezoelectric material has a high mechanical quality in the range from 200 to 2000 and has a high coercive field strength >1.5 kV/mm at room temperature.

2. The method according to claim 1, wherein the measurement of the capacitance takes place by a lock-in process at a defined measurement frequency.

3. The method according to claim 2, wherein the measurement frequency is between 800 Hz and 1.2 kHz.

4. The method according to claim 2 wherein the measurement frequency is 800 Hz.

5. The method according to claim 2, wherein the measurement frequency is 1.2 kHz.

6. A pressure sensor for measurement of a force comprising a piezoelectric material, wherein the piezoelectric material has a high mechanical quality in the range from 200 to 2000 at room temperature, and has a high coercive field strength >1.5 kV/mm, and wherein the pressure sensor comprises an unpolarized pressure sensor and an unpolarized pressure sensor such that capacitances of both the polarized pressure sensor and the unpolarized pressure sensor are supplied to an electrotechnical link in an evaluation unit.

7. A pressure sensor for measurement of a force according to claim 6, wherein the piezoelectric material has a high mechanical quality of 200 at room temperature.

8. A pressure sensor for measurement of a force according to the method according to claim 7, wherein the pressure sensor comprises a round plate with chamfered edges.

9. The pressure sensor according to claim 7, wherein the measurement signal is transmitted wirelessly to the evaluation unit.

10. A pressure sensor for measurement of a force according to claim 6, wherein the piezoelectric material has a high mechanical quality of 2000 at room temperature.

11. The pressure sensor according to claim 6, wherein the pressure sensor comprises a round plate with chamfered edges.

12. The pressure sensor according to claim 6, wherein the measurement signal is transmitted wirelessly to an evaluation unit.

13. A method of measuring a load signal comprising measuring the load signal with the pressure sensor according to claim 6.

14. A method for measurement of a force using a pressure sensor comprising a piezoelectric material, wherein the change in the capacitance of the pressure sensor measures force,
   wherein the measurement of the force takes place simultaneously with a polarized pressure sensor and with an unpolarized pressure sensor and the capacitances of both the polarized pressure sensor and the unpolarized pressure sensor are supplied to an electrotechnical link in an evaluation unit, and wherein the piezoelectric material has a high mechanical quality in the range from 200 to 2000.

* * * * *

UNITED STATES PATENT AND TRADEMARK OFFICE
CERTIFICATE OF CORRECTION

PATENT NO. : 10,031,034 B2
APPLICATION NO. : 14/912793
DATED : July 24, 2018
INVENTOR(S) : Reiner Bindig, Tobias Achmidt and Hans-Juergen Schreiner It is certified that error appears in the above-identified patent and that said Letters Patent is hereby corrected as shown below:

In the Claims

Column 4, Claim 6, Line 42:
Change "comprises an unpolarized pressure sensor and an unpolarized pressure sensor" to
--comprises a polarized pressure sensor and an unpolarized pressure sensor--

Signed and Sealed this
Second Day of April, 2019

Andrei Iancu
*Director of the United States Patent and Trademark Office*